(12) United States Patent
Suzuki et al.

(10) Patent No.: US 7,181,068 B2
(45) Date of Patent: Feb. 20, 2007

(54) MATHEMATICAL EXPRESSION RECOGNIZING DEVICE, MATHEMATICAL EXPRESSION RECOGNIZING METHOD, CHARACTER RECOGNIZING DEVICE AND CHARACTER RECOGNIZING METHOD

(75) Inventors: Masakazu Suzuki, c/o Kyushu University, 6-10-1, Hakozaki, Higashi-ku, Fukuoka-shi, Fukuoka-ken (JP); Kazuaki Yokota, Tokyo (JP); Yuko Eto, Tokyo (JP)

(73) Assignees: Kabushiki Kaisha Toshiba, Tokyo (JP); Masakazu Suzuki, Fukuoka (JP)

( * ) Notice: Subject to any disclaimer, the term of this patent is extended or adjusted under 35 U.S.C. 154(b) by 696 days.

(21) Appl. No.: 10/087,772

(22) Filed: Mar. 5, 2002

(65) Prior Publication Data

US 2002/0126905 A1 Sep. 12, 2002

(30) Foreign Application Priority Data

Mar. 7, 2001 (JP) .............................. 2001-063968

(51) Int. Cl.
*G06K 9/72* (2006.01)
*G06K 9/00* (2006.01)

(52) U.S. Cl. ...................................... 382/229; 382/187
(58) Field of Classification Search ................ 382/229, 382/187
See application file for complete search history.

(56) References Cited

U.S. PATENT DOCUMENTS 5,982,929 A * 11/1999 Ilan et al. .................... 382/200

OTHER PUBLICATIONS

Garain, U. Chaudhuri, B.B., "A syntactic approach to Processing Mathematical Expressions in Printed Documents", Proceedings. 15th International Conference on Pattern Recognition, 2000 vol. 4, On pp. 523-526.*
Hsi-Jian Lee; Jiumn-Shine Wang, "Design of a mathematical expression recognition system", Proceedings of the Third International Conference on Document Analysis and Recognition, 1995.,☐☐vol. 2, Aug. 14-16, 1995 pp. 1084-1087.*
Koschinski, M.; Winkler, H.-J.; Lang, M., "Segmentation and recognition of symbols within handwritten mathematical expression", ICASSP-95 International Conference on Acoustics, Speech, and Signal Processing, vol. 4, May 9-12, 1995 pp. 2439-2442.*

(Continued)

*Primary Examiner*—Bhavesh M Mehta
*Assistant Examiner*—Utpal Shah
(74) *Attorney, Agent, or Firm*—Finnegan, Henderson, Farabow, Garrett & Dunner, L.L.P.

(57) ABSTRACT

A mathematical expression recognizing device comprises a character recognition unit which recognizes characters in a document image, a dictionary storing a pair of evaluation scores for each type of word, the score showing the possibility of belonging to the text and that of belonging to the mathematical expression, an evaluation unit which obtains the evaluation scores showing the possibility of belonging to the text and that of belonging to the mathematical expression for each of the words included in the recognized characters with reference to the dictionary, and a mathematical expression detecting unit which searches for an optimal path connecting words by selecting one of the text and the mathematical expression based on a formative grammar and the evaluation scores showing the possibility of belonging to the text and that of belonging to the mathematical expression for each of the words, thereby detecting characters belonging to the mathematical expression.

12 Claims, 8 Drawing Sheets

OTHER PUBLICATIONS

Winkler, H.-J.; Lang, M. "Online symbol segmentation and recognition in handwritten mathematical expressions" ICASSP-97 IEEE International Conference on Acoustics, Speech, and Signal Processing. vol. 4, Apr. 21-24, 1997 pp. 3377-3380.*

Richard J. Fateman et al., "Optical Character Recognition and Parsing of Typeset Mathematics", Journal of Visual Communication and Image Representation, vol. 7, No. 1, pp. 2-15 (Oct. 1995).

Masayuki Okamoto et al., "Mathematical Expression Recognition by the Layout of Symbols", D-II vol. JZ8-D-II No. 3, pp. 474-482, (Mar. 1995).

Masayuki Okamoto et al., "Mathematical Expression Recognition by Projection Profile Characteristics", D-II vol. JZ8-D-II No. 2, pp. 366-370, (Feb. 1995).

Yuko Eto et al., "Offline Recognition of the Structure of Mathematical Expressions by Spanning Tree of Minimum Cost", , PRMU 99-236, The Institute of Electronics, Information and Communication Engineers pp. 37-44 (Feb. 2000).

Srihari, R. K. et al., "Incorporating Syntactic Constraints in Recognizing Handwritten Sentences," Proceedings of the Thirteenth International Joint Conference on Artificial Intelligence, Morgan Kaufmann Publishers, San Mateo, CA, USA, vol. 2, pp. 1262-1267, Aug. 28, 1993.

Blostein, D. et al., "Computing with Graphs and Graph Transformations," Software Practice & Experience, John Wiley & Sons Ltd. Chichester, GB, vol. 29, No. 3, pp. 197-217, Mar. 1999.

Twaakyondo, H. M. et al., "Structure Analysis and Recognition of Mathematical Expressions," Document Analysis and Recognition, 1995, Proceedings of the Third International Conference on Montreal, Que., Canada Aug. 14-16, 1995, Los Alamitos, CA, USA, IEEE Comput. Soc., US, vol. 1, pp. 430-437, Aug. 14, 1995.

Chang, Chao-Huang, "Word Class Discovery for Postprocessing Chinese Handwriting Recognition," Proc 15th Int. Conf. on Computational Linguistics—Coling 1994, pp. 1221-1225, Aug. 5, 1994.

Toumit, J. Y. et al., "A Hierarchical and Recursive Model of Mathematical Expressions for Automatic Reading of Mathematical Documents," Proc. of the 5th Int. Conf. on Document Analysis and Recognition, ICDAR '99 (CAT No. PR00318), IEEE Comput. Soc., Los Alamitos, CA, USA, pp. 119-122, Sep. 20, 1999.

Hunsinger, J. et al., "A Single-stage Top-down Probabilistic Approach Towards Understanding Spoken and Handwritten Mathematical Formulas," Proc. 6th Int. Conf. on Spoken Language Processing—China Military Friendship Publishers, vol. 4, pp. 386-389, Oct. 16, 2000.

European Search Report for European Patent Application No. 02004377 from the European Patent Office dated Feb. 2, 2005.

Richard J. Fateman et al., Progress in Recognizing Typeset Mathematics, SPIE vol. 2660, pp. 37-50 (1996).

Yuko Eto et al., Mathematical Formula Recognition Using Virtual Link Network, 0-7695-1263-1/01, ICDAR, IEEE, pp. 762-767 (2001).

Masayuki Okamoto et al., Performance Evaluation of a Robust Method for Mathematical Expression Recognition, 0-7695-1263-1/01, ICDAR, IEEE, pp. 121-128 (2001).

European Patent Office Communication dated Apr. 6,2006, in European Patent Application No. 02 004 377.4.

* cited by examiner

| Original Image | with $f(X)=X$, | where $U$ is a |
|---|---|---|
| Recognized Result | with f (,\ )=,\ | where U is a |
| Evaluation { Math | 0 90 100 100 | 0 90 70 90 |
| Text | 100 40 20 20 | 100 40 70 90 |

| NO. | WORD | PART OF SPEECH | MATH | TEXT |
|---|---|---|---|---|
| 1. | with | PP | 0 | 100 |
| 2. | where | PN | 0 | 100 |
| 3. | is | V | 70 | 70 |
| 4. | a | ART | 90 | 90 |
| 5. | .*[^ a-z].* | N | 100 | 70 |
| 6. | .*[^ a-z].*[^ a-z].* | N | 100 | 40 |
| 7. | .*[^ a-z].*[^ a-z].*[^ a-z].* | N | 100 | 20 |
| 8. | [a-z]* | N | 90 | 40 |
| 9. | .* | N | 100 | 5 |
| ⋮ | ⋮ | ⋮ | ⋮ | ⋮ |

DICTIONARY FOR JUDGMENTS ON MATHEMATICAL EXPRESSIONS/TEXTS

FIG. 4

Original Image        with $f(X)=X$,    where $U$ is a
Recognized Result     with f (,\ )=,\    where U is a
Evaluation Scores   Math    0  90 100 100    0  90  70  90
                    Text  100  40  20  20  100  40  70  90  -- Optimal Path
Part                      pp  n?  n?  n?   pn  n?   v  art

FIG. 5

DICTIONARY FOR COUPLING PARTS OF SPEECH $$\lim_{x \to \infty} \int_0^5 \quad \frac{cx^2y^3}{3_a} \quad xdx$$

ORIGINAL IMAGE $$cx^2y^3$$

| CANDIDATE CHARACTERS | C | x | 2 | y | 3 |
|---|---|---|---|---|---|
| | c | X | | Y | |

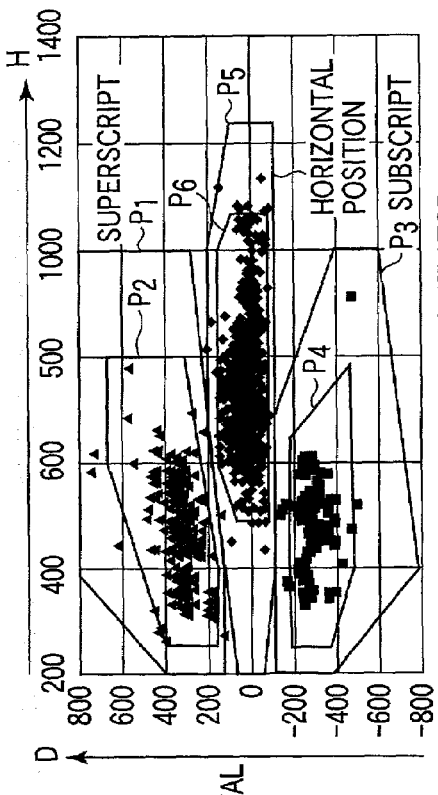
FIG. 11A  ALPHABET TYPE – ALPHABET TYPE
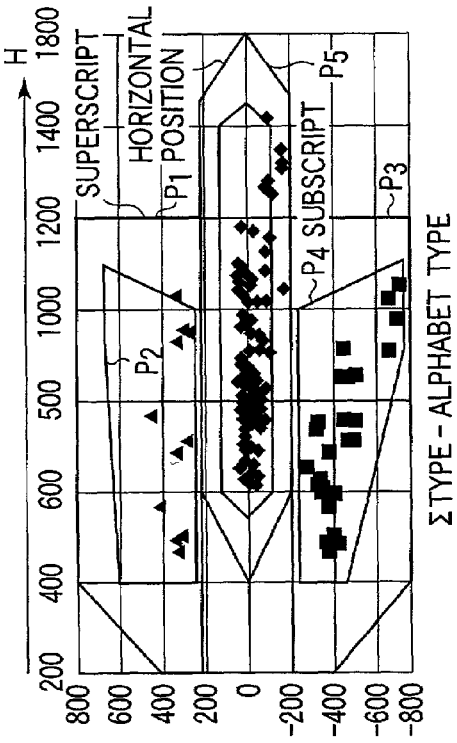
FIG. 11B  ALPHABET TYPE – OPERATOR
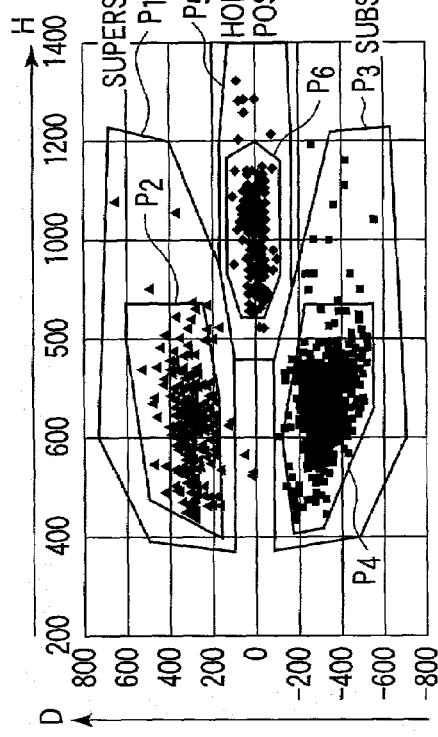
FIG. 11C  INTEGRAL – ALPHABET TYPE
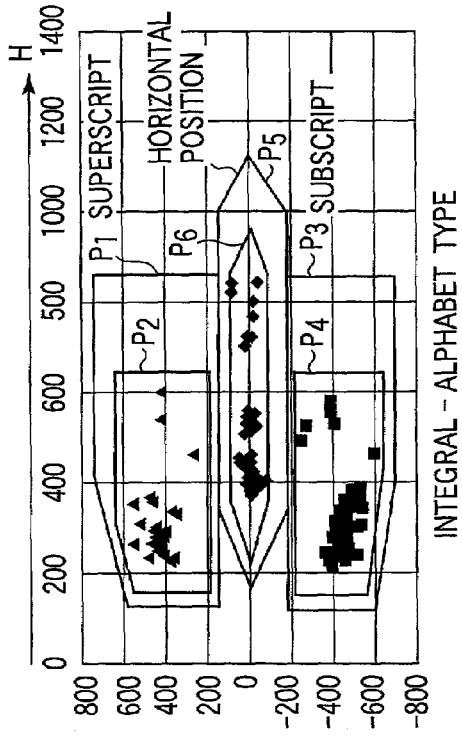
FIG. 11D  ΣTYPE – ALPHABET TYPE $$a^2+b \Rightarrow a^{2+b}$$

"b" FOLLOWING "2" IS MISJUDGED TO BE CONTAINED IN THE INDEX REGION OF "2" BECAUSE "+" IS MISJUDGED TO BE AN INDEX OF "2". THE CHARACTER SIZE OF "b" NEEDS TO BE MADE LARGER THAN "2" AND THE GLOBAL EVALUATION NEEDS TO BE REDUCED.

F I G. 14A $$Ax+By \Rightarrow A_{x+By}$$

"x" IS MISJUDGED TO BE CAPITAL LETTER "X" AND "B" LOCATED ON THE BASE LINE WITH A IS MISJUDGED TO BE IN THE INDEX REGION. THE GLOBAL EVALUATION NEEDS TO BE REDUCED.

F I G. 14B $$Ax+Cx \Rightarrow A_{x+Cx}$$

"C" IS MISJUDGED TO BE SMALLER LETTER "c" AND CONSEQUENTLY THE SIZE OF NORMALIZATION OF "c" BECOMES LARGER THAT THE SIZE OF NORMALIZATION OF "A". THE GLOBAL EVALUATION NEEDS TO BE LOWERED.

F I G. 14C

MATHEMATICAL EXPRESSION RECOGNIZING DEVICE, MATHEMATICAL EXPRESSION RECOGNIZING METHOD, CHARACTER RECOGNIZING DEVICE AND CHARACTER RECOGNIZING METHOD

CROSS-REFERENCE TO RELATED APPLICATIONS

This application is based upon and claims the benefit of priority from the prior Japanese Patent Application No. 2001-063968, filed Mar. 7, 2001, the entire contents of which are incorporated herein by reference.

BACKGROUND OF THE INVENTION

1. Field of the Invention

This invention relates to a mathematical expression recognizing device and a mathematical expressions recognizing method as well as to a character recognizing device and a character recognizing method that can be used for recognizing a document image containing mathematical expressions.

2. Description of the Related Art

Reports on character recognition for printed documents containing mathematical expressions, or mathematical expressions, and recognition of the structures of mathematical expressions have been produced for some time, although the number of such reports is not very large. The characters to be recognized are not necessarily arranged one-dimensionally. Rather, arrangements of characters to be recognized are more often than not two-dimensional as indexes, exponents, fractional numbers and so on are arranged two-dimensionally in ordinary practice. Therefore, there must be provided means for recognizing (determining) not only the characters included in or relating to mathematical expressions but also the structures (positional information) of mathematical expressions in order to know if each of the characters is placed there as an index, an exponent, a denominator, a numerator or something else. Thus, for recognizing a mathematical expression by means of a computer, the time required for the processing operation will be much longer than the time consumed for processing ordinary characters.

Reports on achievements that have made it possible to recognize the structure of a mathematical exposure within a practical processing time include documents [1], [2] and [3] listed below. According to the documents, a rule is defined for determining the positional relationship of the characters in a mathematical expression including that of upper and lower characters and each of the characters is judged to be an ordinary character, an index, an exponent, a denominator, a numerator or something else according to its position by referring to the rule in order to recognize the structure of the mathematical expression.

Document [1]: Masayuki Okamoto, Hashim Msafiri Twaayondo, "Structure Recognition of Mathematical Expressions Using Peripheral Distribution Features", Transaction for the Institute of Electronics, Information and Communication, D-II, Vol. J78-D-II, No. 2, pp. 366–370 (1995).

Document [2]: Masayuki Okamoto, Hiroyuki Azuma, "Recognition of Mathematical Expressions with Emphasis on the Layout of Signs", Transaction for the Institute of Electronics, Information and Communication, D-II, Vol. J78-D-II, No. 3, pp. 474–482 (1995).

Document [3]: R. J. Fateman, T. Tokuyasu, B. P. Berman and N. Mitchell, "Optical Character Recognition and Parsing of Typeset Mathematics", Journal of Visual Communication and Image Representation, Vol. 7, No. 1, pp. 2–15 (1995).

However, with the prior art including the known techniques of the above listed documents, each character is judged to be an ordinary character, an index, an exponent, a denominator, a numerator or something else based on the local characteristic. Therefore, if the position of one character is misjudged, it adversely affects all the subsequent judgments to a significant extent. For example, if an ordinary character is misjudged to be an index, all the ordinary characters arranged after it on the level same as that of the misjudged character are misjudged to be so many indexes. In short, a local misrecognition of a mathematical expression can greatly damage the recognition of the entire structure thereof.

Additionally, the known techniques of the above listed documents only relate to character recognition within a mathematical expression and do not show any technique to detect a mathematical expression in a text.

BRIEF SUMMARY OF THE INVENTION

The present invention is directed to method and apparatus that substantially obviates one or more of the problems due to limitations and disadvantages of the related art and to provide a mathematical expression recognizing device and a mathematical expressions recognizing method as well as to a character recognizing device and a character recognizing method that can be used for recognizing mathematical expressions contained in a document with an enhanced level of accuracy.

According to one aspect of the present invention, there is provided a mathematical expression recognizing device comprising:

a character recognition unit configured to recognize characters in a document image containing a text and a mathematical expression;

a first dictionary configured to store a pair of evaluation scores for each type of word that can be identified by means of normal expression, the score showing the possibility of belonging to the text and that of belonging to the mathematical expression;

an evaluation unit configured to obtain the evaluation scores showing the possibility of belonging to the text and that of belonging to the mathematical expression for each of the words included in the characters recognized by the character recognition unit with reference to the first dictionary; and a mathematical expression detecting unit configured to search for an optimal path connecting words by selecting one of the text and the mathematical expression based on a formative grammar and the evaluation scores showing the possibility of belonging to the text and that of belonging to the mathematical expression for each of the words, thereby detecting characters belonging to the mathematical expression.

According to another aspect of the present invention, there is provided another mathematical expression recognizing device comprising:

a character recognition unit configured to recognize characters in a document image containing a text and a mathematical expression;

a detecting unit configured to detect a mathematical expression region from the characters recognized by the character recognition unit;

a memory configured to store a plurality of items of sample information indicating a relation of a normalization size and a center position between each pair of consecutively arranged characters in terms of the types of the characters including a horizontal positional relationship, character/subscript relationship and character/superscript relationship; and a unit configured to calculate the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters.

According to another aspect of the present invention, there is provided a mathematical expression recognizing device comprising:

a character recognition unit configured to recognize characters in a document image containing a text and a mathematical expression;

a detecting unit configured to detect a mathematical expression region from the characters recognized by the character recognition unit;

a memory configured to store a plurality of items of sample information indicating a relation of a normalization size and a center position between each pair of consecutively arranged characters in terms of the types of the characters including a horizontal positional relationship, character/subscript relationship and character/superscript relationship;

a unit configured to calculate the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters; and a unit for configured to search for an optimal path for connecting the characters in each of the mathematical expression regions without contradiction, select an inter-character structure candidate having a horizontal positional relationship, a character/subscript relationship or a character/superscript relationship for each pair of consecutively arranged characters based on the global evaluation condition and the link candidates, and recognize the horizontal positional relationship, the character/subscript relationship or the character/superscript relationship of the pair of consecutively arranged characters based on the result of the search operation.

According to another aspect of the present invention, there is provided a mathematical expression recognizing method comprising:

recognizing characters in a document image containing a text and a mathematical expression;

referring to a first dictionary which stores a pair of evaluation scores for each type of word that can be identified by means of normal expression, the score showing the possibility of belonging to the text and that of belonging to the mathematical expression to obtain the evaluation scores showing the possibility of belonging to the text and that of belonging to the mathematical expression for each of the words included in the characters recognized by the character; and searching for an optimal path connecting words by selecting one of the text and the mathematical expression based on a formative grammar and the evaluation scores showing the possibility of belonging to the text and that of belonging to the mathematical expression for each of the words, thereby detecting characters belonging to the mathematical expression.

According to another aspect of the present invention, there is provided a mathematical expression recognizing method comprising:

recognizing characters in a document image containing a text and a mathematical expression;

detecting a mathematical expression region from the recognized characters;

referring to a memory which stores a plurality of items of sample information indicating a relation of a normalization size and a center position between each pair of consecutively arranged characters in terms of the types of the characters including a horizontal positional relationship, character/subscript relationship and character/superscript relationship; and calculating the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters.

According to another aspect of the present invention, there is provided a mathematical expression recognizing method comprising:

recognizing characters in a document image containing a text and a mathematical expression;

detecting a mathematical expression region from the recognized characters;

referring to a memory which stores a plurality of items of sample information indicating a relation of a normalization size and a center position between each pair of consecutively arranged characters in terms of the types of the characters including a horizontal positional relationship, character/subscript relationship and character/superscript relationship;

calculating the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters; and searching for an optimal path for connecting the characters in each of the mathematical expression regions without contradiction, selecting an inter-character structure candidate having a horizontal positional relationship, a character/subscript relationship or a character/superscript relationship for each pair of consecutively arranged characters based on the global evaluation condition and the link candidates, and recognizing the horizontal positional relationship, the character/subscript relationship or the character/superscript relationship of the pair of consecutively arranged characters based on the result of the search operation.

According to another aspect of the present invention, there is provided a character recognizing device for reading a document including a mathematical expression and recognizing respectively a text region and a mathematical expression region, comprising:

a character recognition unit configured to recognize the document image including the mathematical expression;

a first dictionary configured to store a pair of evaluation scores for each type of word that can be identified by means of normal expression, the score showing the possibility of belonging to the text and that of belonging to the mathematical expression; and an evaluation unit configured to obtain the evaluation scores showing the possibility of belonging to the text and that of belonging to the mathematical expression for each of the words included in the characters recognized by the character recognition unit with reference to the first dictionary, search for an optimal path connecting words by selecting one of the text and the mathematical expression based on a formative grammar and the evaluation scores showing the possibility of belonging to the text and that of belonging to the mathematical expression for each of the words, thereby discriminating between the text and the mathematical expression.

According to another aspect of the present invention, there is provided a character recognizing device for reading a document including a mathematical expression and recognizing respectively a text region and a mathematical expression region, comprising:

a character recognition unit configured to recognize the document image including the mathematical expression;

a detecting unit configured to detect a mathematical expression region from the characters recognized by the character recognition unit;

a memory configured to store a plurality of items of sample information indicating a relation of a normalization size and a center position between each pair of consecutively arranged characters in terms of the types of the characters including a horizontal positional relationship, character/subscript relationship and character/superscript relationship; and a unit configured to calculate the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters, thereby recognizing a mathematical expression.

According to another aspect of the present invention, there is provided a mathematical expression recognizing device comprising:

a character recognizing unit configured to recognize characters in a document image containing a mathematical expression;

a unit configured to detect a mathematical expression region from the outcome of character recognition obtained by the character recognizing means;

a unit configured to store a plurality of pieces of sample information on the inter-character relationship of the sizes of normalization and that of the center positions of each pair of consecutively arranged characters in terms of the types of the characters and positional relationships of horizontal positional relationship, an inter-character relationship determining unit configured to computationally determining the relationship of the sizes of normalization and that of the center positions of each of all the pairs of consecutively arranged characters in a mathematical expression region and obtain link candidates as combinations of inter-character structure candidates showing the respective possibilities of having a horizontal positional relationship, a character/subscript relationship or a character/superscript relationship based on the result of computation and the sample information and their respective evaluation scores;

a unit configured to store a global evaluation condition based on the distribution of the heights of the characters contained in the mathematical expression regions; and a unit configured to search for an optimal path for connecting the characters in each of the mathematical expression regions without contradiction, selecting an inter-character structure candidate having a horizontal positional relationship, a character/subscript relationship or a character/superscript relationship for each pair of consecutively arranged characters, and recognizing the horizontal positional relationship, the character/subscript relationship or the character/superscript relationship of the pair of consecutively arranged characters based on the outcome of the search operation.

According to another aspect of the present invention, there is provided a character recognizing method for reading a document including a mathematical expression and recognizing respectively a text region and a mathematical expression region, comprising:

recognizing the document image including the mathematical expression;

referring to a first dictionary which stores a pair of evaluation scores for each type of word that can be identified by means of normal expression, the score showing the possibility of belonging to the text and that of belonging to the mathematical expression; and obtaining the evaluation scores showing the possibility of belonging to the text and that of belonging to the mathematical expression for each of the words included in the characters recognized by the character recognition unit with reference to the first dictionary, searching for an optimal path connecting words by selecting one of the text and the mathematical expression based on a formative grammar and the evaluation scores showing the possibility of belonging to the text and that of belonging to the mathematical expression for each of the words, thereby discriminating between the text and the mathematical expression.

According to another aspect of the present invention, there is provided a character recognizing method for reading a document including a mathematical expression and recognizing respectively a text region and a mathematical expression region, comprising:

recognizing the document image including the mathematical expression;

detecting a mathematical expression region from the characters recognized by the character recognition unit;

referring a memory which stores a plurality of items of sample information indicating a relation of a normalization size and a center position between each pair of consecutively arranged characters in terms of the types of the characters including a horizontal positional relationship, character/subscript relationship and character/superscript relationship; and calculating the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters, thereby recognizing a mathematical expression.

According to another aspect of the present invention, there is provided a mathematical expression recognizing method comprising:

recognizing characters in a document image containing a mathematical expression;

detecting a mathematical expression region from the outcome of character recognition obtained by the character recognizing means;

referring to a memory which stores pieces of sample information on the inter-character relationship of the sizes of normalization and that of the center positions of each pair of consecutively arranged characters in terms of the types of the characters and positional relationships of horizontal positional relationship, an inter-character relationship determining unit configured to computationally determining the relationship of the sizes of normalization and that of the center positions of each of all the pairs of consecutively arranged characters in a mathematical expression region and obtaining link candidates as combinations of inter-character structure candidates showing the respective possibilities of having a horizontal positional relationship, a character/subscript relationship or a character/superscript relationship based on the result of computation and the sample information and their respective evaluation scores;

referring to a memory which stores a global evaluation condition based on the distribution of the heights of the characters contained in the mathematical expression regions; and searching for an optimal path for connecting the characters in each of the mathematical expression regions without contradiction, selecting an inter-character structure candidate having a horizontal positional relationship, a character/subscript relationship or a character/superscript relationship for each pair of consecutively arranged characters, and recognizing the horizontal positional relationship, the character/subscript relationship or the character/superscript relationship of the pair of consecutively arranged characters based on the outcome of the search operation.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 4 is a schematic illustration of the dictionary for judgments on mathematical expressions/texts that is used by the embodiment of FIG. 1;

FIG. 5 is a schematic illustration of the operation of searching an optimal path to be used by the embodiment of FIG. 1 in order to detect a mathematical expression;

FIGS. 11A, 11B, 11C and 11D are scatter diagrams that can be used by the embodiment of FIG. 1;

FIGS. 14A, 14B and 14C are schematic illustrations of the conditions to be met for computationally determining a global evaluation that is used for recognizing a mathematical expression by the embodiment of FIG. 1.

DETAILED DESCRIPTION OF THE INVENTION

An embodiment of mathematical expression recognizing device and method and character recognizing device and method according to the present invention will now be described with reference to the accompanying drawings.

Figure 1:
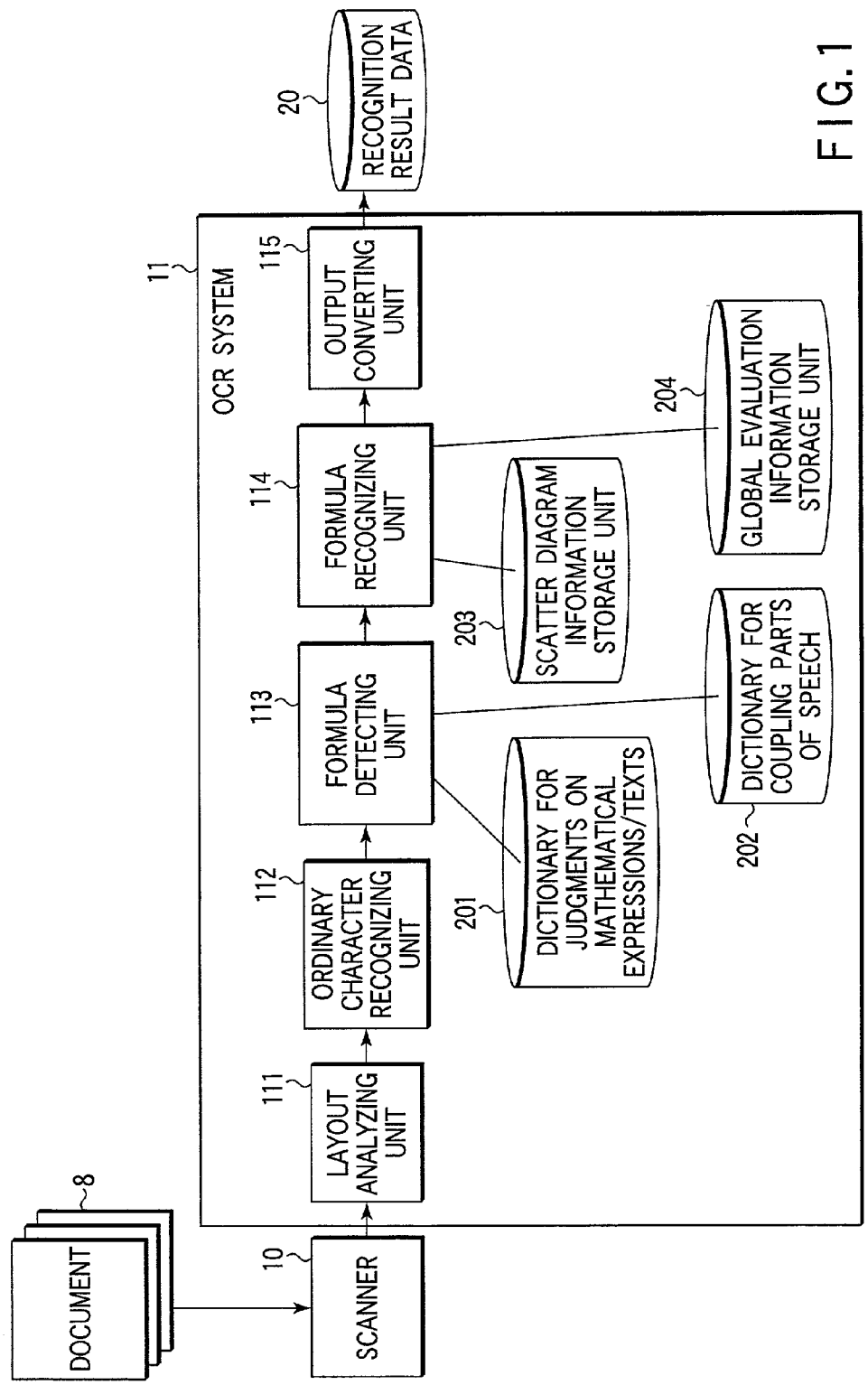
FIG. 1 is a block diagram of an OCR system according to an embodiment of the present invention.

FIG. 1 is a block diagram of a character recognition system realized by using the embodiment of the present invention. The character recognition (optical character recognition: OCR) system 11 is designed to recognize a printed document 8 containing mathematical expressions. Such a printed document 8 may typically be a scientific or technological document. The system 11 reads the printed document 8 by means of a scanner 10 and carries out a processing operation for recognizing each of the text regions and each of the mathematical expression regions in the document. Then, the system 11 outputs electronic document data containing text data and mathematical expression data as data on the results of recognition 20. Documents that can be read by such a system include not only printed documents but also document images containing mathematical expressions that have already been reduced to image data.

The OCR system 11 is realized as a piece of software, or a computer program, that is executed by a computer. It may typically comprises as functional modules a layout analyzing section 111, an ordinary character recognizing section 112, a mathematical expression detecting section 113, a mathematical expression recognizing section 114, an output converting section 115, a dictionary for judgments on mathematical expressions/texts 201, a dictionary for connecting parts of speech 202, a scatter diagram information storage section 203 and a global evaluation information storage section 204. The dictionaries and the information of the storage sections are stored in one or more storage medium such as semiconductor memories and/or magnetic disks.

The processing operation of recognizing a document proceeds in a sequence of 1) scanning the document image, 2) analyzing the layout, 3) recognizing ordinary characters, 4) detecting mathematical expressions, 5) recognizing mathematical expressions and 6) converting the obtained data into electric output data. Now, the processing operation will be described particularly in terms of the method for carrying out the step 4) of detecting mathematical expressions and the step 5) of recognizing mathematical expressions.

Before describing the steps of detecting mathematical expressions and recognizing mathematical expressions in greater detail, the flow of the processing operation will be summarily described below.

Firstly, a page image of the printed document 8 is obtained as the scanner 10 reads the printed document 8 that contains mathematical expressions. Then, the layout analyzing section 111 analyzes the layout of each of the page image and the page image is divided into one or more graphic regions, one or more table regions and one or more text regions. The image data of each of the graphic regions and the table regions are output without any further processing. The ordinary character recognizing section 112 recognized the ordinary characters in the text regions. The operation of recognizing the ordinary characters is realized by dividing lines and cutting out characters based on histogram to as to recognize each of the characters. Thereafter, the mathematical expression detecting section 113 detects and the mathematical expression recognizing section 114 recognizes each of the mathematical expressions based on the outcome of the above operation of character recognition.

The dictionary for judgments on mathematical expressions/texts 201 and the dictionary for connecting parts of speech 202 are used by the mathematical expression detecting section 113 to detect mathematical expressions. The dictionary for judgments on mathematical expressions/texts 201 defines an evaluation score for the possibility of each word of belonging to a text and also an evaluation score for the possibility of the word of belonging to a mathematical expression based on the category that can be specified for the word by means of normal expressions. Thus, an evaluation score value for the possibility of belonging to a text and also an evaluation score for the possibility of belonging to a mathematical expression are judged on a word by word basis by referring to the dictionary for judgments on mathematical expressions/texts 201.

The dictionary for connecting parts of speech 202 defines a formative grammar of texts and mathematical expressions. More specifically, it defines rules of connecting parts of speech of texts and mathematical expressions. Thus, each recognized character is divided into a mathematical expression region or a text region by determining an optimal conjunctive relation of the group of recognized characters containing the word based on the formative grammar provided by the dictionary for connecting parts of speech 202, the evaluation score for the possibility of belonging to a text and the valuation score for the possibility of belonging to a mathematical expression as obtained by referring to the dictionary for judgments on mathematical expressions/texts 201.

All the characters and signs belonging to mathematical expression regions are sent to the mathematical expression recognizing section 114 and subjected to a processing operation for recognizing the structure of each mathematical expression. In this processing operation for recognizing the structure of each mathematical expression, the mathematical expression is decomposed into elements and then each of the elements is checked if it is a character on a base line, a subscripted character or a superscripted character. A plurality of character size scatter diagrams stored in the scatter diagram information storage section 203 and conditions for global evaluation stored in the global evaluation information storage section 204, which will be described in greater detail hereinafter, are used in this checking operation. A pair of consecutively arranged characters may be located on a same base line or one of which may be a subscript or a superscript of the other. A character size scatter diagram that provides sample information shows the size of normalization of the consecutive characters and the distribution of their possible center positions. Thus, inter-character structure candidates and link candidates representing their respective evaluation scores are obtained for any two consecutive characters in a mathematical expression for the purpose of determining their relationship, which may be that of horizontal juxtaposition (on a same base line) or that of subscript or superscript.

The conditions for global evaluation are expressed as conditional mathematical expressions for appropriately determining the inter-character structure based on the global evaluation on all the characters contained in a mathematical expression. By using the global evaluation, it is possible to find an optimal path for conclusively relating the characters in a mathematical expression without any contradiction by referring to determine local inter-character relationships.

The output converting section 115 synthetically combines the results of recognition obtained for the text regions and the mathematical expression regions and outputs data on the results of recognition 20.

Formula Detection Method

Now, a specific method for detecting a mathematical expression will be described below.

Figures 2, 3:
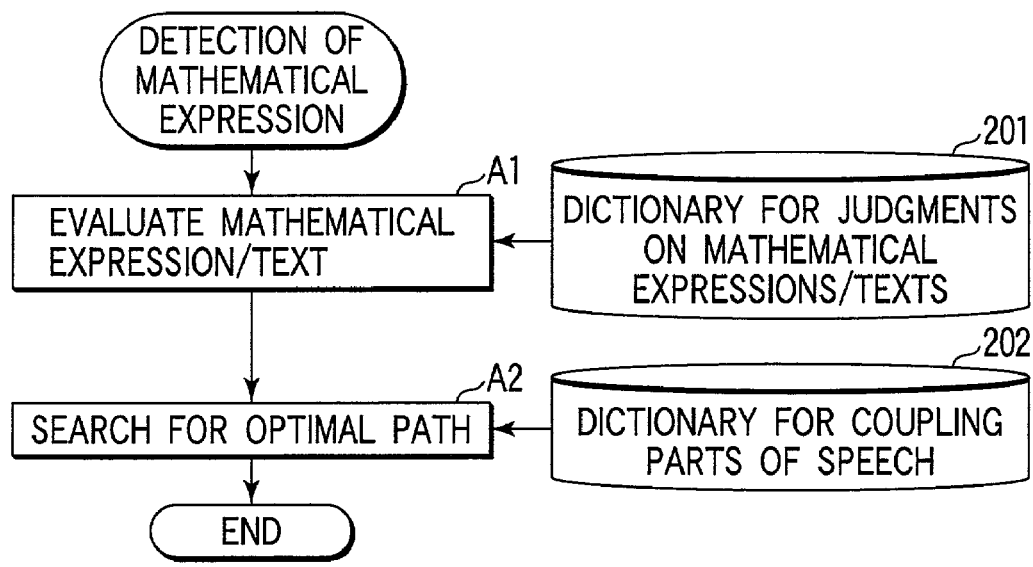
FIG. 2 is a flow chart of the operation of detecting a mathematical expression by the embodiment of FIG. 1.
FIG. 3 is a schematic illustration of the operation of evaluating of mathematical expression/texts that is conducted by the embodiment of FIG. 1 in order to detect a mathematical expression.

In this embodiment, as shown in FIG. 2, a mathematical expression region is detected by means of a mathematical expression detecting method comprising two steps of Step A1 and Step A2. This detecting method is basically devised to detect a mathematical expression out of a document written in English.

<Step A1: Evaluation of Mathematical Expression/Text>

In Step A1, each word is evaluated either as a mathematical expression (Math) or a text (Text) based on ordinary character recognition. A word as used herein refers to a string of characters that are separated from other characters by spaces and detected as a result of character recognition. FIG. 3 illustrates this method.

Referring to FIG. 3, the first line shows an image (original image) input to the system 11. The second line shows the result of recognition obtained as a result of an operation of ordinary character recognition of the ordinary character recognizing section 112. Since the feature of recognizing a mathematical expression cannot be exploited for an operation of recognizing ordinary characters in this embodiment, the ordinary character recognizing section 112 recognizes a mathematical expression merely as an unexpected string of signs. In Step A1, this result of recognition is input and each of the words in the mathematical expression is evaluated either as a mathematical expression or as a text. The values listed to the right of the headings of Math and Text are evaluation scores given to the word. In this embodiment, this processing operation is conducted by referring to the above described dictionary for judgments on mathematical expressions/texts 201. FIG. 4 shows examples of data that may be stored in the dictionary for judgments on mathematical expressions/texts 201.

Referring to FIG. 4, the line with the line number 1 shows that word "with" is a preposition (PP) and has an evaluation score of 0 as Math (mathematical expression) and that of 100 as Text (text). The line with the line number 2 shows that word "where" is a pronoun (PN) and also has an evaluation score of 0 as Math and that of 100 as Text. The line with the line number 3 shows that word "is" is a verb (V) and has an evaluation score of 70 as Math and that of 70 as Text. The line with the line number 4 shows that word "a" is an article (ART) and has an evaluation score of 90 as Math and that of 90 as Text. In this way, the dictionary for judgments on mathematical expressions/texts 201 stores almost all the words that may appear in scientific and technological documents, their respective spellings (arrangement of character code), their respective parts of speech and their respective evaluation scores given to them as mathematical expressions and as text.

Additionally, this embodiment is adapted to flexibly accommodate various strings of signs by means of normal expressions in view of the fact that mathematical expressions may be recognized as so many unexpected strings of signs. Normal expressions are used to express the spellings of words in a flexibly way in character searching systems. The meanings of some of the signs used in normal expressions are shown below.

. represents any character.

* represents 0 or more repetitions of the immediately preceding character (e.g.,.* represents any string of characters).

[ ] represents any one of specified characters in a bracket (e.g., [a–z] represents any of the alphabet characters from "a" to "Z").

^ represents characters other than those specified next (e.g., [^a–z] represents any character other than those from "a" to "Z").

Thus, the line with the line number 5 of FIG. 4 shows that word ".*[^a–z].*" includes a character other than the characters from "a" to "z", or a sign. It is a noun (N) and has an evaluation score of 100 as Math and that of 70 as Text. Similarly, the line with the line number 6 shows that word ".*[^a–z].*[^a–z].*" includes two characters other than the characters from "a" to "z", or one or two signs. It is a noun (N) and has an evaluation score of 100 as Math and that of 40 as Text. The line with the line number 7 shows that word ".*[^a–z].*[^a–z].*[^a–z].*" includes three characters other than the characters from "a" to "z", or one, two or three signs. It is a noun (N) and has an evaluation score of 100 as Math and that of 20 as Text. The line with the line number 8 shows that word "." is a word formed by a single alphabetical letter selected from "a" to "z". It is a noun (N) and has an evaluation score of 90 as Math and that of 40 as Text. Note that noun (N) indicates that the word is a text.

Thus, it is possible to determine the part of speech and the evaluation scores as Math and Text respectively of each word recognized as a result of an operation of character recognition conducted by referring to the dictionary for judgments on mathematical expressions/texts 201 as shown in FIG. 4 on a line by line basis.

More specifically, as shown in FIG. 3, an evaluation score of 0 as Math and that of 100 as Text are given to the word "with" based on the knowledge obtained by referring to the line number 1 of FIG. 4. An evaluation score of 90 as Math and that of 40 as Text are given to the word "f" based on the knowledge obtained by referring to the line number 8 of FIG. 4. An evaluation score of 100 as Math and that of 20 as Text are given to the word "(,\" having three characters based on the knowledge obtained by referring to the line number 7 of FIG. 4. An evaluation score of 100 as Math and that of 20 as Text are given to the word ")=,\" having four characters based on the knowledge obtained by referring to the dictionary for judgments on mathematical expressions/texts 201 although such an arrangement of characters is not shown in FIG. 4. Similarly, an evaluation score of 0 as Math and that of 100 as Text are given to the word "where" based on the knowledge obtained by referring the line number 2 of FIG. 4. An evaluation score of 90 as Math and that of 40 as Text are given to the word "U" based on the knowledge obtained by referring the line number 8 of FIG. 4. An evaluation score of 70 as Math and that of 70 as Text are given to the word "is" based on the knowledge obtained by referring the line number 3 of FIG. 4. An evaluation score of 90 as Math and that of also 90 as Text are given to the last word "a" based on the knowledge obtained by referring to the line number 4 of FIG. 4 because the knowledge of the line number 4 has priority to that of the line number 8.

<Step A2: Search of Optimal Path>

Figure 6:
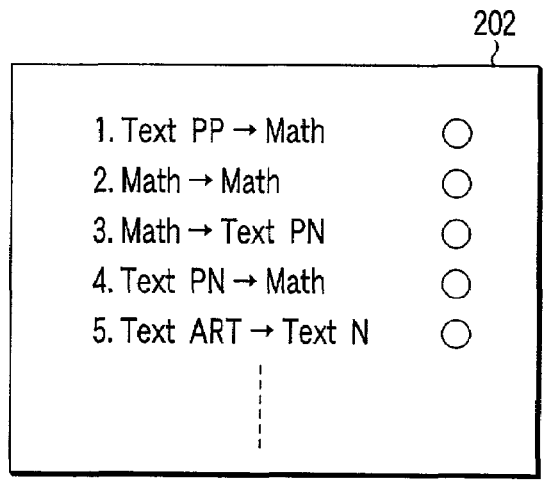
FIG. 6 is a schematic illustration of the dictionary for connecting parts of speech that is used by the embodiment of FIG. 1.

Then, in the next step of Step A2, a processing operation of searching an optimal path from the result of evaluation and coupling the evaluation scores is conducted. FIG. 5 schematically illustrates this operation. In this Step A2, the dictionary for connecting parts of speech 202 is used because it shows what part of speech can be connected to what part of speech in a text and what part of speech in a text can be connected to a mathematical expression. FIG. 6 shows examples of data that may be stored in the dictionary for connecting parts of speech 202.

Referring to FIG. 6, "Text pp→Math" on the first line shows that a preposition (PP) in a text can be connected to the immediately succeeding mathematical expression. "Math→Math" on the second line shows that two or more than two mathematical expressions can be connected. "Math→Text PN" on the third line shows that a mathematical expression can be connected to the immediately succeeding pronoun (PN) in a text. "Text PN→Math" on the fourth line shows that a pronoun (PN) in a text can be connected to the immediately succeeding mathematical expression. "Text ART→Text N" on the fifth line shows that an article (ART) in a text can be connected to the immediately succeeding noun (N) in the text.

The dictionary for connecting parts of speech 202 stores all the possible combinations that are good for connecting. Any other combinations are not good for connecting.

In an operation of searching for an optimal path, either mathematical expression or text is selected for each word by referring to its evaluation scores and only permissible connections are traced for the detected words according to the rules of the formative grammar defined in the dictionary for connecting parts of speech 202. Then, the path showing the largest sum of evaluation scores given to the words as mathematical expressions and texts is searched and selected out of all the possible connection paths. In short, the word "with" in FIG. 5 may be connected to the immediately following word "with" when the word "with" is Math and the word "f" is either Math or Text and when the word "with" is Text and the word "f" is either Math or Text. However, the path from Text "with" to Math "f" is selected because the sum of the evaluation scores of this combination shows the largest value. FIG. 5 shows that an optimal path of Text, Math, Math, Math, Text, Math, Text and Text is selected and traced for connecting the eight words starting from the first word "with" and ending with the last word "a."

This searching algorithm can be realized by means of a technique of beam search (which is also referred to as width-prioritized search). The beam search is a well known algorithm in the field of dynamic programming. It is designed to eliminate paths that are judged to be poorly possibly selected as optimal paths in order to reduce the dimensions of the space to be searched and also both the amount of computations and the memory capacity necessary for searching an optimal path.

As a result of the above described search operation, each of the words is judged to belong to either a mathematical expression or a text and mathematical expression regions and text regions are detected. In the instance of FIG. 5, it will be seen that the four words of "f", "(,\", ")=,\" and "U" are judged to belong to a mathematical expression, whereas all the other words are judged to belong to a text. The regions of the image data corresponding to the words that are judged to belong to mathematical expressions are mathematical expression regions, whereas the regions of the image data corresponding to the words that are judged to belong to texts are text regions.

It should be noted that a more sophisticated formative grammar such as a context-free grammar may be defined to describe connective relations in order to check the connections of parts of speech for the purpose of this invention. Such a grammar is equivalent to a normal grammar but more sophisticated than the latter.

Conventional systems of the type under consideration are adapted to use more simple rules for detecting mathematical expressions. For example, when one or more parenthesis and/or italic letters are recognized in a group of words, they normally so determine that the group of words are those of a mathematical expression. Such systems normally cannot deal with various signs included in a recognized mathematical expression. If a word of "a" is found in a text, the systems cannot determine if it is an indefinite article or a character in a mathematical expression. To the contrary, this embodiment can determine if each word belongs to a mathematical expression or a text more accurately by referring to the evaluation scores of the word in a manner as described above. Additionally, since the embodiment utilizes a formative grammar for checking each word, it is possible to determine that a word "a" that is not immediately followed by a noun belongs to a mathematical expression based on the rule that only a noun can directly follow "a" if the latter is an article.

(Mathematical Expression Recognizing Method)

Figure 7:
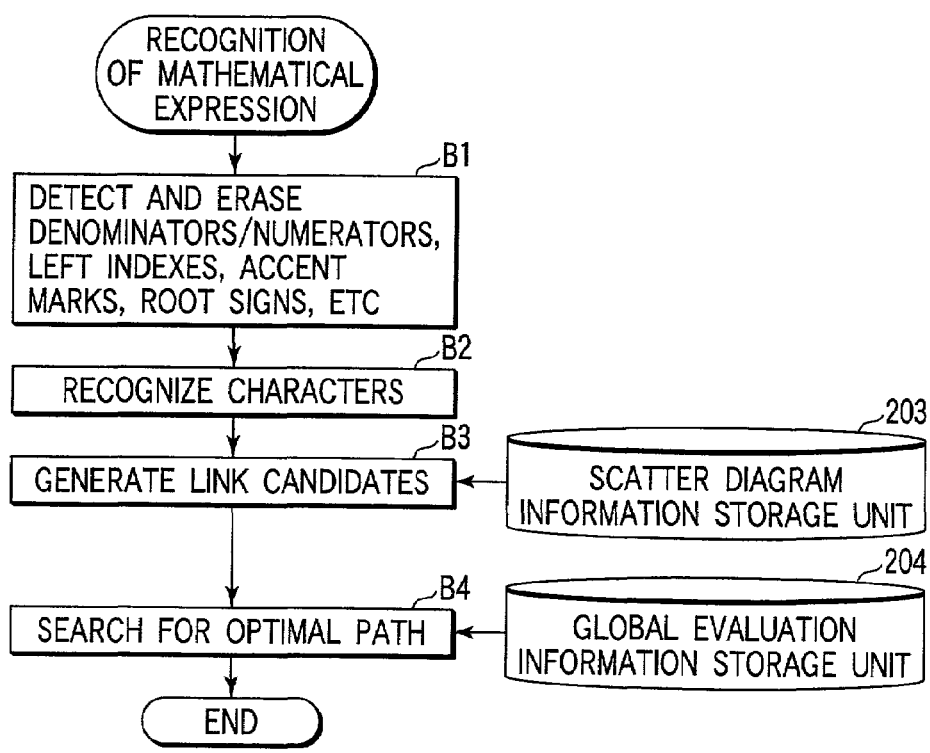
FIG. 7 is a flow chart of the operation of recognizing a mathematical expression by the embodiment of FIG. 1.

For recognizing a mathematical expression, it is necessary to use a technique of checking the structure of the expression in terms of indexes, power exponents, denominators/numerators and so on in addition to recognition of characters. Therefore, in this sense recognition of a mathematical expression is more complicated than recognition of an ordinary character. In this embodiment, characters are recognized by means of a known character recognition technique, whereas the structure of a mathematical expression is checked by a method comprising four steps of Step B1, Step B2, Step B3 and Step B4, which will be described below by referring to FIG. 7.

<Step B1: Detection of Structure in Terms of Denominators/Numerators, Left Indexes, Accent Marks, Root Signs, Dots and so on>

In Step B1, dividing bars of fractions, root signs and so on of mathematical expression regions are detected and denominators, numerators and words in root signs are isolated. Similarly, if there are any left indexes, accent marks, root signs, dots and so on are detected and erased from the image data of the mathematical expression regions.

Figures 8, 9, 10:
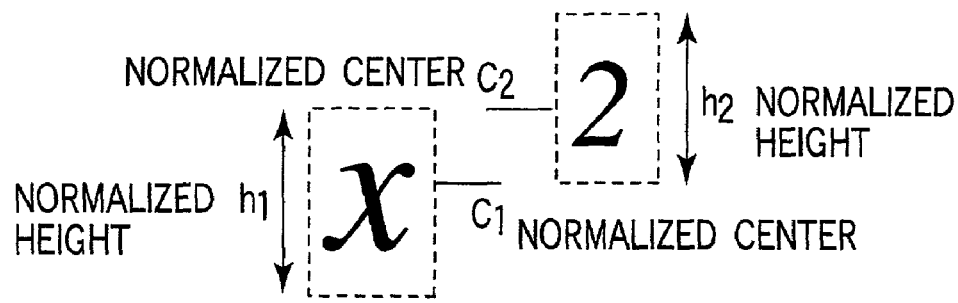
FIG. 8 is a schematic illustration of the operation of decomposing a mathematical expression that is conducted by the embodiment of FIG. 1 in order to recognize the mathematical expression.
FIG. 9 is a schematic illustration of the operation of detecting candidate characters to be used for recognizing a mathematical expression by the embodiment of FIG. 1.
FIG. 10 is a schematic illustration of the operation of computationally determining the size of normalization and the center of normalization to be used for recognizing a mathematical expression by the embodiment of FIG. 1.

If for example, a mathematical expression shown in FIG. 8 is contained in a mathematical expression region that is detected in a manner described above, it is decomposed into four mathematical expression components surrounded by broken lines in FIG. 8. Then, the left index is erased from the mathematical expression component ($^3$a→a) and the accent mark "^" or "~" is erased from the mathematical expression component (xdx^→xdx). Although not shown in FIG. 8, root signs and dots, if any, will also be erased ($\sqrt{a+b}$→a+b) (x.→x).

Mathematical Elements such as denominators/numerators, left indexes, accent marks, root signs and dots can be detected relatively accurately according to the above cited documents [1], [2] and [3]. In many cases, they can be detected by a simple method that relies on local positional relationships of such elements. Therefore, the succeeding steps of Step B2 through Step B4 can be limited to subscripts and superscripts (power exponents) by using the simple detection method of detecting other mathematical elements as listed above to reduce the time required for them.

<Step B2: Character Recognition>

In the succeeding steps of Step B2 through Step B4, the component mathematical expressions that are made free from dividing bars, accent marks, left indexes, root signs and dots in Step B1 are processed.

In Step B2, linked black elements are extracted from the component mathematical expressions for the image data of the component mathematical expression obtained in Step B1 and subjected to a process of character recognition. As a result, the candidate characters shown in the lower half of FIG. 9 are obtained for the component mathematical expression of the denominator in FIG. 8. FIG. 9 shows a component mathematical expression of $cx^2y^3$ whose image data is subjected to character recognition. Each character (linked black element) may be a capital letter, a small letter or a numeral.

<Step B3: Generation of Link Candidates>

In Step B3, the possibility of connecting any two characters is checked on all the obtained candidate characters by using the relationship illustrated in FIG. 10. FIG. 10 shows the values to be used for determining the positional relationship of any two consecutive characters (the size of normalization and the center of normalization). The two characters may be arranged horizontally (on a same base line) or one of them may be a subscript or superscript of the other. Referring to FIG. 10, the values h1, h2 are respectively the sizes (heights) of normalization of the characters in question. When two characters are located on a same line, the size of normalization refers to the corrected size that makes them have a same size (height).

Note that the size of normalization refers here to the height from the top of ascenders (e.g., the top of letter "d") to the bottom of descenders (e.g., the bottom of letter "y"). In other words, the value of h1 shows the height of combined two letters of "d" and "y" that are typed one on the other. "d" is a letter where a black link line segment extends to the top of the ascender and "y" is a letter where a black link line segment extends to the bottom of the descender. For example, the letter "x" in FIG. 10 has a height smaller than that of the letter "d" or "y". Therefore, "x" can be made to show the size of normalization h1 that is equal to the height of combined two letters of "d" and "y" that are typed one on the other by multiplying its actual height by a given multiplier. The value of the multiplier to be used for making each character show the size of normalization is defined in advance. Thus, the character is made to show the size of normalization by multiplying its actual height by the given multiplier that is defined in advance. For example, the height of a small letter "c" is expanded both upwardly and downwardly. On the other hand, the height of a capital letter "C" is expanded only downwardly.

Similarly, the actual size of character "2" located in an index region is multiplied by a multiplier that is specifically defined for it to make it show the size of normalization of h2 to be used for indexes. Since characters located in index regions have a small actual size, the size of normalization h2 to be used for the character "2" located in an index region is made smaller than the size of normalization h1 to be used for the character "x" located on the base line.

In FIG. 10, c1 and c2 denote respective centers of normalization. The center of normalization refers is used to make all the characters on a same line show a same center position in terms of height. Here, the center of normalization is defined as the middle point of the y-coordinate values of a rectangle circumscribed about the normalized character (to be referred to character rectangle hereinafter). If the heights and the centers of normalization of two adjacently located characters are h1 and c1 and h2 and c2 respectively, character size scatter diagrams shown in FIG. 11A through FIG. 11D are obtained by plotting the relationship of the sizes of normalization $H=(h2/h1)\times 1000$ and the relationship of the centers of normalization $D=\{(c1-c2)/h1\}\times 1000$.

The four scatter diagrams (sample information) of FIG. 11A through FIG. 11D illustrate the results obtained by observing pairs of characters that are located on a same horizontal base line, pairs of characters of which one of each pair is a superscript of the other and pairs of characters of which one of each pair is a subscript of the other for the relationships of the seizes H and centers D of normalization in terms of different types of characters. More specifically, FIG. 11A shows a scatter diagram obtained when both of any two consecutive characters are alphabet type letters. Alphabet type letters as used herein refers to ordinary alphabetical letters, Greek letters and numerals. FIG. 11B shows a scatter diagram obtained when each pair of consecutively arranged characters includes an alphabetical letter and an operator. FIG. 11C shows a scatter diagram obtained when each pair of consecutively arranged includes an integral type character and an alphabet type character. FIG. 11D shows a scatter diagram obtained when each pair of consecutively arranged characters includes a $\Sigma$ type character and an alphabet type character.

Thus, it is now possible to determine inter-character structure candidates, each of which may show a horizontal positional relationship, a character/subscript relationship or a character/superscript relationship, and their respective sets of evaluation scores (to be referred to as link candidates hereinafter) by computationally determining the values of H and D for each pair of candidate characters obtained in Step B2 and judging the polygonal region in the scatter diagram of the corresponding combination of character types to which the pair belongs. For instance, if the relationship of the sizes of normalization H and that of the centers of normalization D of a pair of consecutively arranged characters is found in the polygonal region P1 or P2 in FIG. 11A, the two characters are judged to show a character/superscript relationship. The total evaluation score may be higher when they belong to P2 than when they belong to P1 since the number of points in the region P1 is larger than that in the region P2. If, on the other hand, the relationships are found in the polygonal region P3 or P4, the two characters are judged to show a character/subscript relationship. The total evaluation score may be higher when they belong to P4 than when they belong to P3. If, finally, the relationships are found in the polygonal region P5 or P6, the two characters are judged to show a horizontal positional relationship. The total evaluation score may be higher when they belong to P5 than when they belong to P6.

Figure 12:
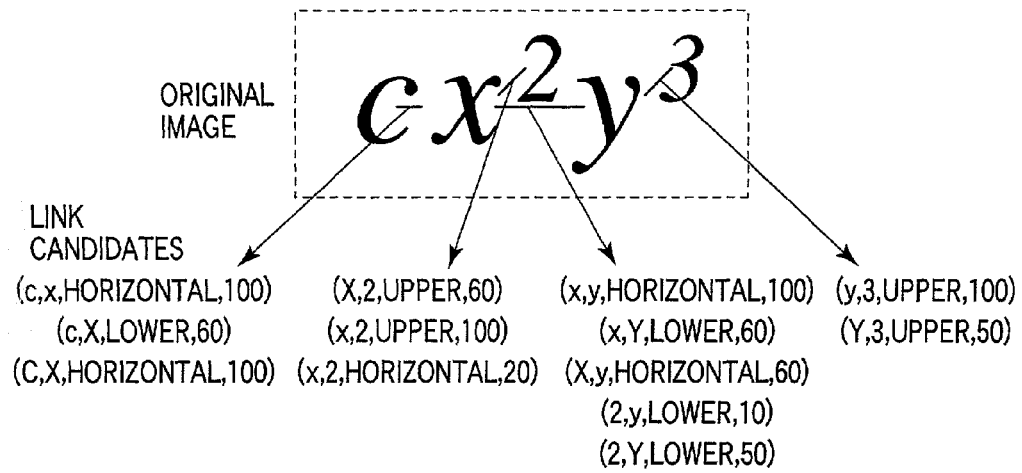
FIG. 12 is a schematic illustration of link candidates that may be generated between two consecutive characters by the embodiment of FIG. 1.

FIG. 12 shows a schematic illustration of link candidates that are generated between pairs of two consecutive characters for the component mathematical expression of FIG. 9. In FIG. 12, each link candidate shows (parent (left) candidate character, child (right) candidate character, type of connection and evaluation score. Note that a link candidate is generated for any two consecutively arranged characters and also for two characters that are arranged one after the other with a character located in an index region between them (x and y in FIG. 12).

As shown in FIG. 12, the following link candidates are generated for the characters of "c" and "x" by referring to the scatter diagram of FIG. 11A;

(c, x, horizontal, 100),
(c, X, lower, 60) and
(c, X, horizontal, 100).

It will be appreciated that the combination of (C, x) cannot exist because the relationship of H and D are not found in any region of the scatter diagrams.

The following link candidates are generated for the characters "x" and "2", which is an index, by referring to the scatter diagram of FIG. 11A;

(X, 2, upper, 60),
(x, 2, upper, 100) and
(x, 2, horizontal, 20).

The following link candidates are generated for the characters of "x" and "y" by referring to the scatter diagram of FIG. 11A, taking the index "2" into consideration;

(x, y, horizontal 100),
(x, Y, lower, 60),
(X, y, horizontal 60),
(2, y, lower 10) and
(2, Y, lower, 50).

Finally, the following link candidates are generated for the characters "y" and "3", which is an index, by referring to the scatter diagram of FIG. 11A;

(y, 3, upper, 100) and
(Y, 3, upper, 50).

In an aspect, this embodiment uses four scatter diagrams as shown in FIG. 11A through FIG. 11D that are prepared for combinations of characters of different types. As seen from FIG. 11A through FIG. 1D, the distribution of inter-character relationships can vary significantly depending on the types of the characters of each pair. In view of this fact, the scatter diagrams are prepared to accommodate combinations of characters of different types so that the inter-character relationship of a pair of characters may be judged by referring to the corresponding one of the scatter diagrams.

According to any of the above cited documents [1], [2] and [3], an index is detected by seeing if its center of normalization is displaced upwardly or downwardly from the horizontal center of the parent character or not. From the viewpoint of the scatter diagrams of FIG. 11A through FIG. 11D, this means that an index is detected by using only the vertical coordinates of the scatter diagrams and hence the probability of detecting a wrong index and that of missing an index are high. To the contrary, according to the present invention, an index is detected in a two-dimensional region by taking the combination of characters of different types and different sizes into consideration and preparing scatter diagrams for combinations of characters of different types. As a result, the accuracy of detecting indexes is remarkably improved.

Now, before describing the next step, the reason why recognition of mathematical expression structures is a problem of detecting an optimal path will be discussed below.

A mathematical expression has a tree structure and signs are not arranged on a same line. This is the reason why the fact that it is a problem of detecting an optimal path is not understood by many people. According to the invention, an optimal path is obtained by drawing a whole tree showing optimal mathematical expression structures by using the link network prepared in Step B3. The connection of each character to its parent character can be judged by drawing a whole tree. Thus, a set of (parent (left) candidate character, child (right) candidate character, type of connection, evaluation score) is referred to as a link candidate and each character rectangle is made to carry all the link candidates relating to the child character in the rectangle. Then, a whole tree is defined by selecting a single link candidate from each rectangle. Such selections may be regarded as an operation of tracing paths. Therefore, recognition of mathematical expression structures is a problem of detecting an optimal path.

However, such paths may not entirely be regarded as a tree of mathematical expression structures. For example, a character can have only a child character arranged horizontally on the same line or arranged as a superscript or a subscript (non-existence of duplicate links). Additionally, all the recognized candidates of a character as selected based on right or left connection or index connection in the character rectangle thereof need to agree with each other for it to be part of a mathematical expression (selection of a uniqueness candidate). A whole tree that meets these two requirements is referred to as non-contradictory mathematical expression syntactical tree and the paths forming such a whole tree is referred to as applicable paths. An optimal path is selected out of these applicable paths. In the following description, the simple expression of path refers to an applicable obtained from a non-contradictory whole tree.

<Step B4: Search for Optimal Path>

Then, in Step B4, an optimal path is searched for by backwardly (or forwardly) tracing the link candidates generated between pairs of characters in Step B3 in order to connect the link candidates. More specifically, the path showing the largest total evaluation scores is searched for among the paths that can connect the characters without contradiction by taking the connecting relationships between any two consecutive characters (horizontal positional relationships, character/subscript relationships and character/superscript relationships) into consideration and selecting one of the link candidates of each pair of consecutively arranged characters. Additionally, in this embodiment, the total value of the local evaluation scores of the respective pairs of characters given by their link candidates is corrected based on the three conditions for global evaluation that are defined by turn based on the distribution of the heights of the characters contained in the mathematical expression component. The optimal path is searched for also by referring to the corrected total evaluation score.

If the size of normalization of the character in the index region of each parent character is greater than the size of normalization of the parent character as shown in FIG. 14A, the total evaluation score is reduced. In the instance of FIG. 14A, "+" is erroneously judged to be an index to "2" so that "b" that follows is also misjudged to be located in the index area. Misjudgments of this type can often occur when a character is judged by relying only on the local evaluation score. However, since "b" has a size equal to that of "a" and its size of normalization is greater than that of "2", its total evaluation score is reduced.

If two consecutively arranged characters are found on the same line and the succeeding one of the two characters is located in the index region of the preceding character as shown in FIG. 14B, the total evaluation score is also reduced. Differently stated, the total evaluation score is reduced if a character that belongs to any of the small regions P2, P4, P6 of the scatter diagram of FIG. 11A through FIG. 11D is located in the index region of the immediately preceding character that is found on the base line. FIG. 14B shows an instance where small letter "x" is mistaken for capital letter "X". Since character "B" located close to character "A" that is located on the base line is found in the index region, the total evaluation score is reduced.

The total evaluation score is also reduced if the sizes of normalization of the alphabet type characters of located on the base line are differentiated beyond a certain limit as shown in FIG. 14C. Differently stated, FIG. 14C shows an instance where capital letter "C" is mistaken for small letter "c". Then, the size of normalization of the small letter "c" becomes greater than the size of normalization of the capital letter "A". Therefore the total evaluations core is reduced.

Thus, the conditions for global evaluation are those that need to be met in order to modify the total evaluation score of the path that can connect the characters in a mathematical expression without any contradiction, selecting one of the link candidates of every pair of characters from the viewpoint of a horizontal positional relationship, a character/subscript relationship and a character/superscript relationship. The operation of searching for an optimal path that produces the largest total evaluation score can be conducted at high speed also by using a technique of beam search (which is also referred to as width-prioritized search).

Figure 13:
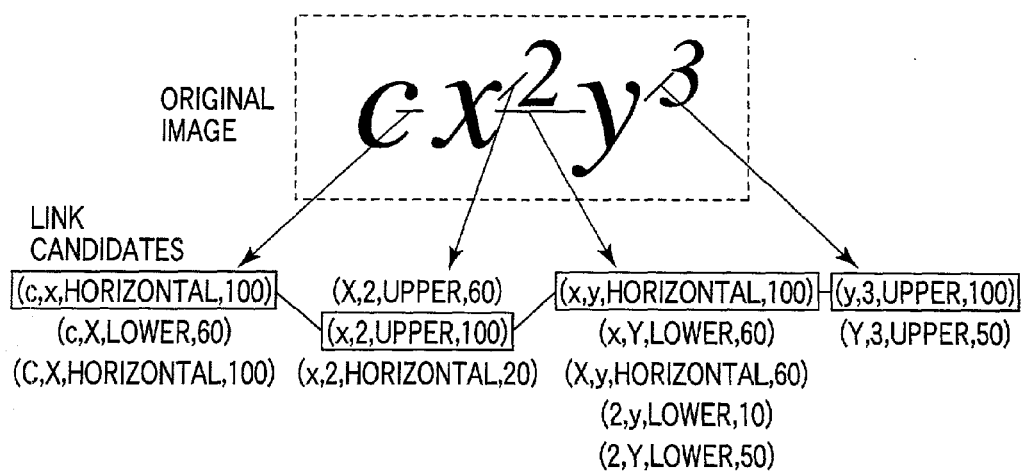
FIG. 13 is a schematic illustration of the operation of searching an optimal path to be used by the embodiment of FIG. 1 in order to recognize a mathematical expression.

FIG. 13 shows an example of optimal path as judged by considering the conditions for global evaluation. In this way, an optimal link candidate is selected for each intra-character relationship and the intra-character relationship is judged to be a horizontal positional relationship, a character/subscript relationship or a character/superscript relationship.

The techniques described in the above cited documents [1], [2] and [3] lack the concept of global evaluation. Therefore, if a single character on the base line is mistaken for an index, all the following characters are mistaken for so many indexes. This is, if partly, because each character is judged to be an index or a power exponent based on a computational operation conducted by using only local characteristic aspects of the character. To the contrary, the concept of global evaluation is adopted by the present invention for following paths so that, if a character is mistaken for an index, the problem of mistaking all the following characters does not occur. Then, it is possible to evaluate the outcome of the operation of an external device for recognizing a mathematical expression by using the technique of global evaluation. It is also possible to apply the technique to a complex judgment operation.

Then, the final result of recognition is obtained for the mathematical expression component by giving back the left indexes, the accent marks, the root signs and so on, if any, that are temporarily removed in Step B1 to the string of characters that are linked optimally. Then, the final result of recognition is obtained for the mathematical expression region by conducting the processing operation of Steps B2 through B4 on each of the mathematical expression components. The data on the outcome of the recognition of the entire document including text regions and mathematical expression regions are obtained by synthetically combining the results of recognition of the text regions and the mathematical expression regions.

Thus, according to the present embodiment, a mathematical expression recognizing device comprises a character recognition unit configured to recognize characters in a document image containing a text and a mathematical expression, a first dictionary configured to store a pair of evaluation scores for each type of word that can be identified by means of normal expression, the score showing the possibility of belonging to the text and that of belonging to the mathematical expression, an evaluation unit configured to obtain the evaluation scores showing the possibility of belonging to the text and that of belonging to the mathematical expression for each of the words included in the characters recognized by the character recognition unit with reference to the first dictionary, and a mathematical expression detecting unit configured to search for an optimal path connecting words by selecting one of the text and the mathematical expression based on a formative grammar and the evaluation scores showing the possibility of belonging to the text and that of belonging to the mathematical expression for each of the words, thereby detecting characters belonging to the mathematical expression.

As a mathematical expression region is recognized by means of an ordinary operation of character recognition, unexpected characters may appear in the result of recognition. In view of this problem, the mathematical expression recognizing device comprises a dictionary to be used for classifying the words contained in the outcome of an operation of character recognition that is conducted by using normal expressions into different types and obtaining evaluation scores for each type of word used for classification that show respectively the possibility of belonging to a text and that of belonging to a mathematical expression. Therefore, it is possible to give evaluation scores to each word in a flexibly way by referring to the dictionary. Each mathematical expression is detected by searching an optimal path connecting each pair of consecutively arranged words either for the text or for the mathematical expression on the basis the evaluation scores computationally judged for each word respectively in terms of text and mathematical expression. With this arrangement, it is possible to accurately detect any mathematical expression region and hence recognize the mathematical expressions contained in a document.

According to the present embodiment, a mathematical expression recognizing device comprises a character recognition unit configured to recognize characters in a document image containing a text and a mathematical expression, a detecting unit configured to detect a mathematical expression region from the characters recognized by the character recognition unit, a memory configured to store a plurality of items of sample information indicating a relation of a normalization size and a center position between each pair of consecutively arranged characters in terms of the types of the characters including a horizontal positional relationship, character/subscript relationship and character/superscript relationship, and a unit configured to calculate the relation of the normalization size and the center position between each pair of consecutively arranged characters included in the mathematical expression region and obtain link candidates for the horizontal positional relationship, the character/subscript relationship and the character/superscript relationship based on the calculated relation of the normalization size and the center position and the sample information corresponding to the calculated relation of the types of the two consecutively arranged characters.

The mathematical expression recognizing device comprises a plurality of items of sample information for different types of combinations of two consecutively arranged characters and therefore it is possible to determine the inter-character relationship of each detected pair of consecutively arranged characters to be a horizontal positional relationship, a character/subscript relationship or a character/superscript relationship by referring to the pieces of sample information corresponding to the types of the characters for which the inter-character relationship is to be judged. With this arrangement, it is possible to reduce the error rate of operation of determining the positions of characters in a mathematical expression and improve the efficiency of the operation of recognizing the structure of mathematical expressions.

According to the present embodiment, a mathematical expression recognizing device comprises a character recognizing unit configured to recognize characters in a document image containing a mathematical expression, a unit configured to detect a mathematical expression region from the outcome of character recognition obtained by said character recognizing means, a unit configured to store a plurality of pieces of sample information on the inter-character relationship of the sizes of normalization and that of the center positions of each pair of consecutively arranged characters in terms of the types of the characters and positional relationships of horizontal positional relationship, an inter-character relationship determining unit configured to computationally determining the relationship of the sizes of normalization and that of the center positions of each of all the pairs of consecutively arranged characters in a mathematical expression region and obtaining link candidates as combinations of inter-character structure candidates showing the respective possibilities of having a horizontal positional relationship, a character/subscript relationship or a character/superscript relationship based on the result of computation and the sample information and their respective evaluation scores, a unit configured to store the conditions for global evaluation prejudged based on the distribution of the heights of the characters contained in said mathematical expression regions, and a unit configured to search for an optimal path for connecting the characters in each of said mathematical expression regions without contradiction, selecting an inter-character structure candidate having a horizontal positional relationship, a character/subscript relationship or a character/superscript relationship for each pair of consecutively arranged characters, and recognize the horizontal positional relationship, the character/subscript relationship or the character/superscript relationship of said pair of consecutively arranged characters based on the outcome of the search operation.

Thus, it is possible not only to determine the local relationship of each pair of consecutively arranged characters but also to search an optimal path that can connect the characters in a mathematical expression region without contradiction so as to ultimately maximize the total evaluation scores, taking the conditions for global evaluation into consideration. Therefore, if the positional relationship of a pair of consecutively arranged characters is misjudged, the misjudgment is prevented from affecting the operation of determining the entire structure of a mathematical expression.

As described above, the present embodiment provides the following advantages.

It is possible to efficiently detect mathematical expression regions efficiently by judging each word to be as that of a text or a mathematical expression and searching for an optimal path for connecting words based on the formative grammar and the evaluation scores given to each word in terms of text and mathematical expression.

It is possible to accurately determine the positional relationship of each pair of consecutively arranged characters to be as a horizontal positional relationship, a character/subscript relationship or a character/superscript relationship by preparing a plurality of scatter diagrams showing the sizes of normalization and the centers of normalization of pairs of consecutively arranged characters.

It is possible to prevent any misjudgment on the positional relationship of a pair of consecutively arranged characters from affecting the operation of determining the entire structure of a mathematical expression by not only determining the local relationship of each pair of consecutively arranged characters but also searching an optimal path, taking the conditions for global evaluation into consideration.

It is possible to reduce the number of characters to be used for generating link candidates to improve the efficiency of the entire processing operation by carrying out a preprocessing operation of decomposing mathematical expressions into components and detecting left indexes, accent marks, root signs and so on before generating link candidates and searching for optimal paths.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as prejudged means, allowing the computer to realize a prejudged function, or allowing the computer to conduct prejudged means. For example, the OCR system 11 of the above described embodiment can be realized entirely by means of software. Therefore, the advantages of the present invention can be realized by preparing a program for the above processing sequence that a computer can execute, storing it in a computer-readably storage medium, introducing it into a computer by way of the storage medium and causing the computer to execute the program.

According to the present invention, it is possible to make a mathematical expression recognizing device highly accurately recognize mathematical expressions contained in a document. Therefore, the present mathematical expression recognizing device can be advantageously utilized for producing electronic documents from printed scientific and technological documents.

What is claimed is:

1. A mathematical expression recognizing device comprising:
    a character recognition unit configured to recognize characters in a document image containing a text and a mathematical expression;
    a first dictionary configured to store a pair of evaluation scores for each type of word that can be identified by means of normal expression, a first one of the pair of evaluation scores giving the probability of belonging to the text and a second one of the pair of evaluation scores giving the probability of belonging to the mathematical expression;
    an evaluation unit configured to obtain from the first dictionary the first and second evaluation scores showing the probability of belonging to the text and that of belonging to the mathematical expression for each of the words included in the characters recognized by the character recognition unit with reference to the first dictionary; and
    a mathematical expression detecting unit configured to search for an optimal path connecting words by selecting one of the text and the mathematical expression based on a formative grammar and the first and second evaluation scores showing the possibility of belonging to the text and that of belonging to the mathematical expression for each of the words, the optimal path having the largest sum of evaluation scores given to a word, thereby detecting characters belonging to the mathematical expression.

2. The device according to claim 1, wherein said mathematical expression detection unit comprises:
    a second dictionary configured to store a connectable part of speech and mathematical expression as the formative grammar; and
    a search unit configured to search for a path connecting the words and showing the largest evaluation score given to the word as the mathematical expression or the text, out of all possible inter-word connection paths as the optimal path, by selecting either the text or mathematical expression for each word according to the part of speech of the word and the formative grammar read out from said second dictionary.

3. The device according to claim 1, further comprising:
    a memory configured to store a plurality of items of sample information indicating a relation of a normalization size and a center position between each pair of consecutively arranged characters in terms of the types of the characters including a horizontal positional relationship, character/subscript relationship and character/superscript relationship; and
    a determination unit configured to calculate the relation of the normalization size and the center position between each pair of consecutively arranged characters included in a mathematical expression region and obtain link candidates for the horizontal positional relationship, the character/subscript relationship and the character/superscript relationship based on the calculated relation of the normalization size and the center position, and the sample information coming from the memory and corresponding to the calculated relation of the types of the two consecutively arranged characters.

4. The device according to claim 3, further comprising:
    a memory configured to store a global evaluation condition determined based on a distribution of the heights of the characters contained in said mathematical expression region;
    a unit configured to search, using data from the memory to find an optimal path for connecting the characters in each of said mathematical expression regions without contradiction;
    a unit configured to select an inter-character structure candidate having a horizontal positional relationship, a character/subscript relationship or a character/superscript relationship for each pair of consecutively arranged characters based on said global evaluation condition and said link candidates; and a unit configured to recognize the horizontal positional relationship, the character/subscript relationship or the character/superscript relationship of said pair of consecutively arranged characters based on the result of the search operation.

5. The device according to claim 4, wherein said global evaluation condition comprises at least one of the relationship of the height of a character contained in a subscript region and the height of each of other characters, the positional relationship between a base line and a character contained in the subscript regions, and the dispersion of heights among characters located on a same horizontal level.

6. The device according to claim 3, further comprising:

a decomposing unit configured to decompose each mathematical expression detected by said mathematical expression detection unit into components and remove at least left indexes, accent marks, root signs, and dots from each component, and wherein said determination unit obtains link candidates for the components from which the left indexes, accent marks, root signs, or dots is removed.

7. A mathematical expression recognizing method comprising:

recognizing characters in a document image containing a text and a mathematical expression;

referring to a first dictionary which stores a pair of evaluation scores for each type of word that can be identified by normal expression, a first one of the pair of evaluation scores giving the probability of belonging to the text and a second one of the pair of evaluation scores giving the probability of belonging to the mathematical expression to obtain the evaluation scores showing the probability of belonging to the text and that of belonging to the mathematical expression for each of the words included in the characters recognized by the character; and searching for an optimal path connecting words by selecting one of the text and the mathematical expression based on a formative grammar and the first and second evaluation scores for each of the words, thereby detecting characters belonging to the mathematical expression.

8. The method according to claim 7, further comprising:

configuring a second dictionary to store a connectable part of speech and mathematical expression as the formative grammar; and searching for a path connecting the words and showing a largest evaluation score given to the word as the mathematical expression or the text, out of all possible inter-word connection paths as the optimal path, by selecting either the text or mathematical expression for each word according to the part of speech of the word and the formative grammar read out from the second dictionary.

9. The method according to claim 7, further comprising:

storing a plurality of items of sample information indicating a relation of a normalization size and a center position between each pair of consecutively arranged characters in terms of the types of the characters including a horizontal positional relationship, a character/subscript relationship and a character/superscript relationship; and calculating the relation of the normalization size and the center position between each pair of consecutively arranged characters included in a mathematical expression region and obtain link candidates for the horizontal positional relationship, the character/subscript relationship and the character/superscript relationship based on the calculated relation of the normalization size and the center position, and the sample information corresponding to the calculated relation of the types of the two consecutively arranged characters.

10. The device according to claim 9, further comprising:

storing a global evaluation condition determined based on a distribution of the heights of the characters contained in the mathematical expression region;

finding an optimal path for connecting the characters in each of said mathematical expression regions without contradiction;

selecting an inter-character structure candidate having a horizontal positional relationship, a character/subscript relationship or a character/superscript relationship for each pair of consecutively arranged characters based on the global evaluation condition and the link candidates; and recognizing the horizontal positional relationship, the character/subscript relationship or the character/superscript relationship of the pair of consecutively arranged characters based on the result of the search operation.

11. The method according to claim 10, wherein said global evaluation condition comprises at least one of the relationship of the height of a character contained in a subscript region and the height of each of other characters, the positional relationship between a base line and a character contained in the subscript region, and the dispersion of heights among characters located on a same horizontal level.

12. The device according to claim 9, further comprising:

decomposing each mathematical expression detected into components; and removing at least left indexes, accent marks, root signs, and dots from each component, wherein link candidates are obtained for the components from which the left indexes, accent marks, root signs, or dots is removed.

* * * * *